(12) United States Patent
Kawade

(10) Patent No.: US 7,980,794 B2
(45) Date of Patent: Jul. 19, 2011

(54) RING WITH CUTTING EDGE (RING-SHAPED CHAMFER TOOL)

(75) Inventor: Yasuhiko Kawade, Gifu (JP)

(73) Assignee: Mitsubishi Materials Corporation, Tokyo (JP)

( * ) Notice: Subject to any disclaimer, the term of this patent is extended or adjusted under 35 U.S.C. 154(b) by 373 days.

(21) Appl. No.: 12/267,780

(22) Filed: Nov. 10, 2008

(65) Prior Publication Data

US 2009/0129881 A1    May 21, 2009

(30) Foreign Application Priority Data

Nov. 19, 2007    (JP) .................................. 2007-299384

(51) Int. Cl.
*B23B 51/08*    (2006.01)
*B23B 51/10*    (2006.01)

(52) U.S. Cl. ......... 408/191; 408/224; 408/233; 408/713

(58) Field of Classification Search .................. 408/118, 408/117, 191, 193, 196, 197–198, 224, 225, 408/231, 233, 713; *B23B 51/08, 51/10*
See application file for complete search history.

(56) References Cited

U.S. PATENT DOCUMENTS

| | | | | |
|---|---|---|---|---|
| 857,344 | A * | 6/1907 | Henry | 408/192 |
| 1,111,410 | A * | 9/1914 | Semon | 408/191 |
| 2,833,168 | A | 5/1958 | Nelson | |
| 3,575,520 | A | 4/1971 | Halpern | |
| 3,794,438 | A * | 2/1974 | Knutsson | 408/231 |
| 5,071,295 | A * | 12/1991 | Greig | 279/156 |
| 5,211,635 | A * | 5/1993 | Omi et al. | 408/224 |
| 5,915,895 | A | 6/1999 | Jager et al. | |
| 6,595,729 | B2 * | 7/2003 | Karlsson | 408/118 |
| 2004/0057804 | A1 | 3/2004 | Jager et al. | |
| 2006/0120814 | A1 * | 6/2006 | Lipohar et al. | 408/181 |

FOREIGN PATENT DOCUMENTS

| | | |
|---|---|---|
| DE | 2120320 | 11/1972 |
| DE | 3610016 A1 * | 10/1987 |
| DE | 4331453 A1 * | 3/1995 |
| FR | 2369775 A * | 6/1978 |
| JP | 04069105 A * | 3/1992 |
| JP | 2003-117711 A | 4/2003 |
| JP | 2004-524979 A | 8/2004 |
| JP | 2006-043868 A | 2/2006 |

* cited by examiner

*Primary Examiner* — Daniel W Howell
(74) *Attorney, Agent, or Firm* — Leason Ellis LLP.

(57) ABSTRACT

A ring with a cutting edge detachably fixed to a drilling tool, and machines the peripheral edge of a hole bored by the drilling tool can be simply attached to the drilling tool. A ring with a cutting edge is constituted by a ring portion, in which an insertion hole allowing a drilling tool to be inserted in the direction of an axis O thereof and having a circular shape in plane view, is formed, the ring portion has a portion on the inner peripheral surface provided with a recess formed radially outward, a circular-arc arm portion, which extends in the peripheral direction from one peripheral end of the inner peripheral surface toward the other peripheral end thereof, in the opening edge of the recess facing the inner peripheral surface and is elastically deformable in the radial direction, is formed integrally in the ring portion, and the circular-arc arm portion is pressed axially inward by a fastening screw threadedly attached to a threaded attachment hole which goes through the ring portion in the radial direction, and is opened to a bottom surface of the recess.

5 Claims, 4 Drawing Sheets

RING WITH CUTTING EDGE (RING-SHAPED CHAMFER TOOL)

INCORPORATION BY REFERENCE

The present invention claims priority under 35 U.S.C. 119 to Japanese Patent Application No. 2007-299384 filed Nov. 19, 2007. The content of said application is incorporated herein by reference in its entirety.

TECHNICAL FIELD

The present invention relates to a ring with a cutting edge which is detachably fixed to a drilling tool, and is for machining the peripheral edge of a hole bored by the drilling tool.

BACKGROUND ART

Regarding tools which machine the peripheral edge of a hole bored by a drilling tool (such as a drill), PCT Japanese Translation Patent Publication No. 2004-524979 ("JP '979"), Japanese Unexamined Patent Application Publication No. 2006-43868 ("JP '868"), and Japanese Unexamined Patent Application Publication No. 2003-117711 ("JP '711") show a type of ring with a cutting edge as an example, in which a cutting edge tip for machining the peripheral edge of the hole is attached to a ring portion fixed to the drilling tool. In this ring with a cutting edge, the peripheral edge of the hole can be machined before the drilling tool is pulled out of the hole. Thereby, both operations, boring a hole and machining its peripheral edge, can be efficiently performed.

As this convention type of ring with a cutting edge, JP '979 teaches one example in which the ring with a cutting edge is fastened and fixed to the surface of a chip discharge groove (twist groove) of a drilling tool located at the inner peripheral side of a fastening ring, by a fastening screw going through a ring portion in its radial direction. In this case, a fastening shoe is provided between the fastening screw and the chip discharge groove (twist groove).

Further, as one conventional ring with a cutting edge, JP '868 teaches one example in which the ring with a cutting edge is constituted by two divided bodies divided into two in the peripheral direction of a ring portion, and the divided bodies are fastened together by screws. In this case, the inner diameter of the ring portion is required to be smaller (for example, −1.0 to 0.0 mm) than the outer diameter of the drill.

Moreover, as another conventional ring with a cutting edge, JP '711 teaches one example in which a slit is formed in one place in the peripheral direction of a ring portion, and this tool is fastened by screws such that the width of the slit becomes smaller and thereby fixed to a drilling tool.

However, two or more of twisted chip discharge grooves are formed in a normal drill. Therefore, in the ring with a cutting edge described in JP '979, it is necessary to operate two or more of fastening screws for fixing the ring with a cutting edge to the drill. Thus, there is a problem in that the operation for attaching is with some trouble. Moreover, since the ring with a cutting edge described in JP '979 is fixed to the drill via the fastening shoe, there is a possibility that the central axes of the drill and the ring with a cutting edge may be largely off each other. Further, in the ring with a cutting edge described in JP '868 and JP '711, the ring portion is fastened and fixed by screws such that the gap between the two divided bodies and the width of the slit may become smaller. Therefore, there is a problem in that the ring portion easily rotates when the screws are operated, and the operation for attaching this tool is also with some trouble.

This invention aims at providing a ring with a cutting edge which is easily attachable to a drilling tool.

SUMMARY OF THE INVENTION

In order to solve the above problems and achieve such aim, a ring with a cutting edge related to the invention is a ring with a cutting edge detachably fixed to a drilling tool and having a cutting edge insert which machines a peripheral edge of a hole bored by the drilling tool. The ring with a cutting edge having a ring portion in which an insertion hole, allowing the drilling tool to be inserted in the direction of an axis thereof and having a circular shape in plane view, is formed. The ring portion has a portion on the inner peripheral surface provided with a recess formed radially outward. A circular-arc arm portion, which extends in the peripheral direction from one peripheral end of the inner peripheral surface toward the other peripheral end thereof in the opening edge of the recess facing the inner peripheral surface and is elastically deformable in the radial direction, is formed integrally in the ring portion. The circular-arc arm portion is pressed axially inward by a fastening screw threadedly attached to a threaded attachment hole which goes through the ring portion in the radial direction and is opened to a bottom surface of the recess.

To fix the ring with a cutting edge having this construction to the drilling tool, while inserting the drilling tool into the insertion hole, the fastening screw is operated to press the circular-arc arm portion axially inward.

As a result, since the circular-arc arm portion elastically deforms axially inward, and then the inner diameter of the insertion hole of the ring with a cutting edge becomes gradually smaller, the drilling tool can be fastened by the inner peripheral surface of the ring with a cutting edge including the circular-arc arm portion. That is, a portion of the inner peripheral surface of the ring portion is constituted by the circular-arc arm portion. Thereby, the contacting area between the inner peripheral surface of the ring with a cutting edge and the outer peripheral surface of the drilling tool increases.

Therefore the force which fastens the ring with a cutting edge to the drilling tool increase, and also the ring with a cutting edge can be firmly fixed.

Further, as aforementioned, the ring with a cutting edge has a construction in which, for fixing directly its ring portion to the drilling tool, the inner diameter of the insertion hole gradually becomes smaller.

Therefore, this construction can prevent the occurrence of misalignment between the drilling tool and the ring with a cutting edge. Moreover, to fix the ring with a cutting edge to the drilling tool, the fastening screw is inserted and also moved axially inward.

Therefore, the ring with a cutting edge is prevented from rotating around the axis in response to the drilling tool. Thus the ring with a cutting edge is easily attachable to the drilling tool.

Further, this ring with a cutting edge having this construction is allowed to have a form in which the inner diameter of the ring portion is larger (for example, 0.05 to 0.2 mm) than the outer diameter of the drilling tool. As a result, the drilling tool can be easily inserted into the insertion hole of the ring portion.

Further, the ring with a cutting edge may further include a position adjusting mechanism which allows the cutting edge insert to move in the radial direction in response to the ring portion.

Also, the ring with a cutting edge may further include a protrusion which protrudes in the direction of the axis from a front end face of the ring portion which faces a front end of the drilling tool.

The protrusion may be divided by a slit extending along the axis, into an inner protrusion which fixes the cutting edge insert, and an outer protrusion placed more axially outside than the inner protrusion.

The position adjusting mechanism may include the protrusion, and a position adjusting screw, which is threadedly attached to the outer protrusion that goes through the outer protrusion in the radial direction, and presses the inner protrusion axially inward in response to the outer protrusion.

On condition that the ring with a cutting edge having such a position adjusting mechanism is attached to the drilling tool, and even if the cutting edge insert is separated from the outer peripheral surface of the drilling tool;

the position adjusting mechanism allows the cutting edge insert to move axially inward and to make a contact with the outer peripheral surface of the drilling tool.

Further, before attaching the ring with a cutting edge to the drilling tool, the position adjusting screw is previously loosened to release the pressure at the inner protrusion, and then the cutting edge insert is moved radially outward.

Thereby, when attaching the ring with a cutting edge to the drilling tool, the cutting edge insert can be prevented from rubbing against the outer peripheral surface of the drilling tool; namely, the cutting edge insert can be prevented from being pressed against the outer peripheral surface with an excessive force. Therefore, the cutting edge insert can also be protected.

Further, in the ring with a cutting edge, a cap member, which protrudes axially inward from the inner peripheral surface and fills a gap between the inner peripheral surface and a chip discharge groove of the drilling tool, may be fixed at the front end face of the ring portion facing the front end of the drilling tool.

In this case, chips generated during the drilling by the drilling tool can be prevented from entering the insertion hole.

Further, the ring portion is locked into the chip discharge groove via the cap member. Thus, during the cutting edge insert is machining the peripheral edge of a hole, the cap member can entirely prevents the ring with a cutting edge from rotating in response to the drilling tool.

Moreover, in the ring with a cutting edge, the cutting edge insert may be formed as such that, when the cutting edge insert has a contact with the outer peripheral surface of the drilling tool, a front end of the cutting edge insert located at the front end of the drilling tool along the axis, is separated from the outer peripheral surface.

While machining the peripheral edge of a hole by the cutting edge insert, this construction can prevent the occurrence of an excessive stress which is imposed on the front end of the cutting edge insert sandwiched between the outer peripheral surface of the drill body and the peripheral edge of the hole. That is, while machining the peripheral edge of a hole, the cutting edge insert can also be protected.

According to the invention, a portion of the inner peripheral surface of the ring portion is constructed by the elastically deformable circular-arc arm portion. Also the circular-arc arm portion is pressed radially inward by the fastening screw. Thereby, the ring with a cutting edge can be easily and firmly fixed to the drilling tool.

DETAILED DESCRIPTION OF THE INVENTION

Hereinafter, an embodiment of a ring with a cutting edge related to the invention will be described with reference to FIG. 1 to FIG. 4.

Figure 1:
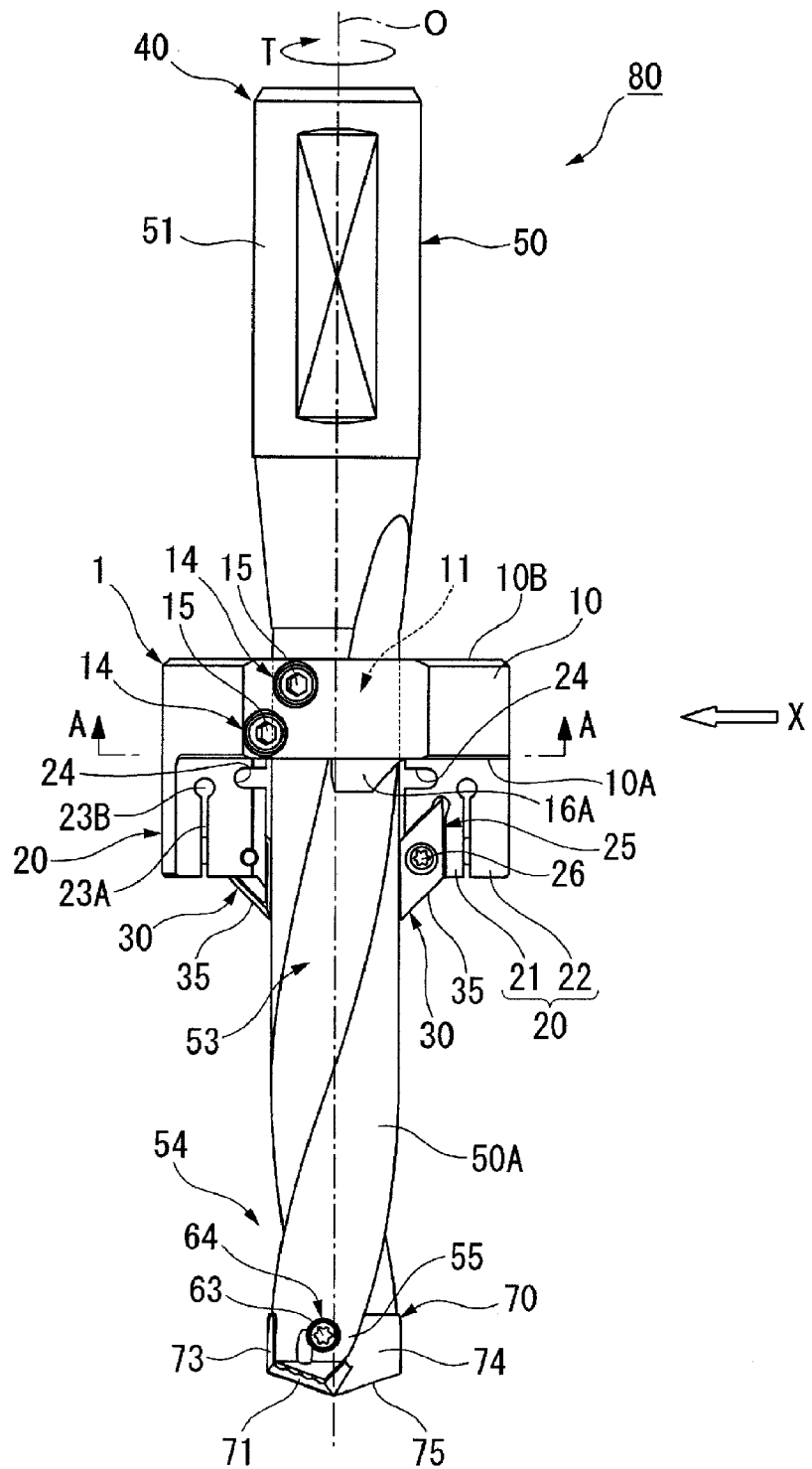
FIG. 1 is a side view showing a state where a ring with a cutting edge which is an embodiment of the invention is attached to a drill.
Figure 2:
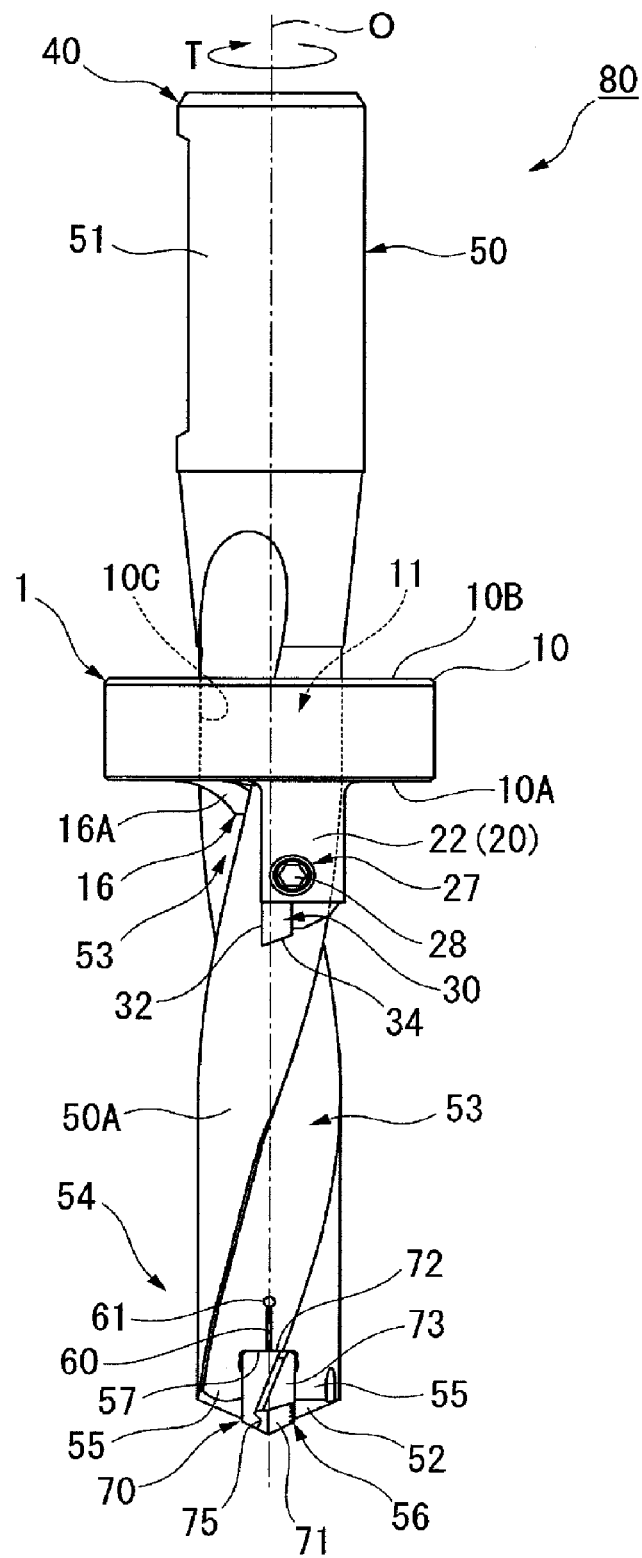
FIG. 2 is a view as seen in the direction of an arrow X of FIG. 1.

As shown in FIGS. 1 and 2, the ring with a cutting edge 1 in this embodiment is detachably fixed to a drill (drilling tool) 40. In other words, the ring with a cutting edge 1 is easily attachable to the drill 40 and is easily detachable from it. Furthermore, the ring with a cutting edge 1 can be firmly fixed to the drill 40 in usage.

The ring with a cutting edge 1 and the drill 40 constitute the cutting tool 80, which is capable of drilling a hole and simultaneously with chamfering the peripheral edge of the hole bored by the drill 40.

Here, the drill 40 includes a substantially multi-stage cylindrical drill body 50 which rotates around an axis O, and an insert 70 which is detachably mounted on a front end (the lower side in FIG. 1 or 2) of the drill body 50.

A shank portion 51, for attaching the drill body 50 to a spindle end of a machine tool, is formed at a rear end (the upper side in FIGS. 1 and 2) of the drill body 50.

A pair of chip discharge grooves 53 and 53, which is opened to a front end face 52 of the drill body 50 and is twisted toward a trailing side of the drill 40 in its rotational direction T as it goes toward the rear end of the drill body 50, is formed rotationally symmetrically through 180° with respect to an axis O at an outer periphery of the front end of the drill body 50.

A pair of jaw portions 55 and 55 which protruded toward the front end, face each other, and the axis O is sandwiched between the jaw portions. The jaw portion 55 is formed at a front end 54 of the drill body 50.

The portion between the pair of jaw portions 55 and 55 is an insert attachment seat 56 of the insert 70. In addition, the aforementioned front end face 52 is formed at the front end of the jaw portion 55.

A slit 60, which extends along the axis O toward the rear end of the drill body 50, is formed at a bottom 57 of the insert attachment seat 56. The slit 60 is open to the chip discharge grooves 53 and 53, and is located between the pair of jaw portions 55 and 55.

Further, a cutout portion 61, which has a larger width than the width of the slit 60, is formed at the rear end of the slit 60 in the drill body 50.

Further, an insertion hole 64, for inserting a clamp screw 63, is formed at the front end 54 of the drill body 50.

As the insertion hole 64 goes to the axis O in a radial direction, this form allows the clamp screw 63 to go through the slit 60 in its width direction.

A female threaded portion (not shown in Figs) for threadedly attaching the clamp screw 63, is formed in the insertion hole 64 only on a one side of jaw portion 55.

A front end face 71 of the insert 70 has a conical shape, namely V-shape, which is convex to its top point. (downward direction in FIG. 1)

Further, on condition that the insert is mounted on the insert attachment seat 56, the insert 70 has a form in which one pair of rake faces 74 has an approximately concavely curved surface smoothly connected to the front end of the chip discharge groove 53 toward the leading side of the drill 40 in its rotational direction T. Here, each rake face 74 intersects the front end face 71, a rear end face 72 of the insert 70 orthogonal to the axis O toward the rear end of the drill body 50, and an outer peripheral surface 73 of the insert 70 directed radially outward of the drill body 50.

Also, a cutting edge 75 is formed at an intersecting ridgeline portion of each rake face 74 and the front end face 71 of the insert 70.

On condition that the insert 70 is mounted on the insert attachment seat 56 of the drill body 50, by pushing the clamp screw 63 from the insertion hole 64 on the other side of jaw portion 55, and also by threadedly attaching the clamp screw 63 to the insertion hole 64 on the one side of jaw portion 55; this insert 70 is sandwiched between the pair of jaw portions 55 and 55, and is thereby firmly fixed to the drill body 50.

Figure 3:
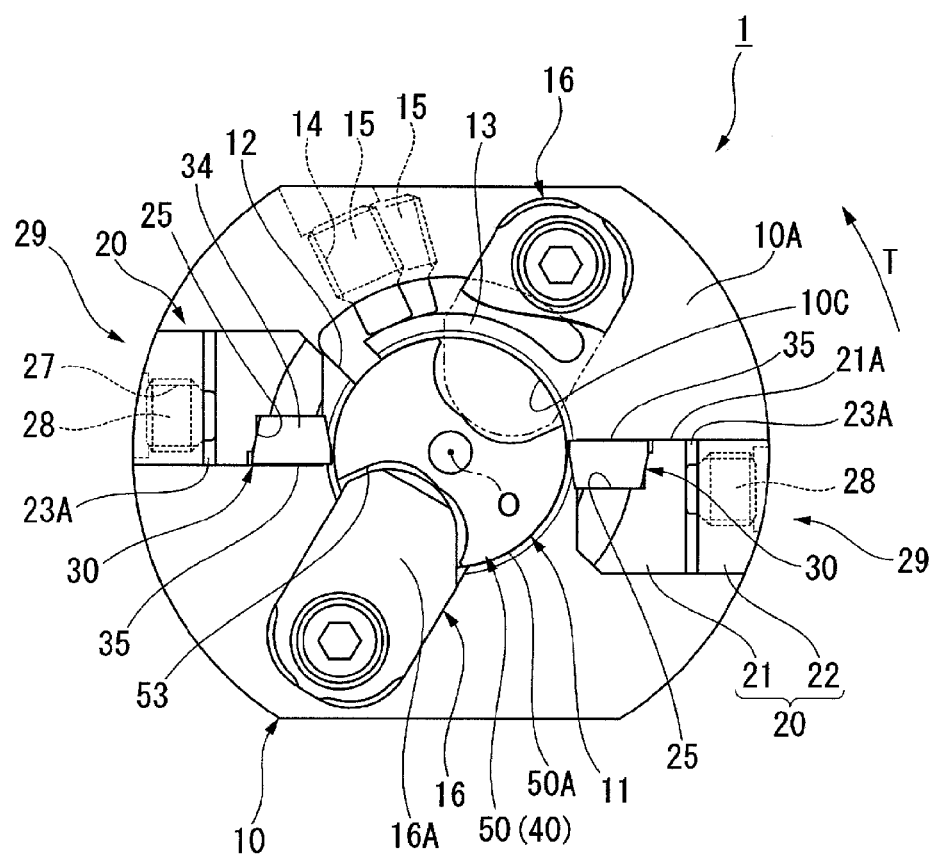
FIG. 3 is a sectional view taken along an A-A arrow of FIG. 1.
Figure 4:
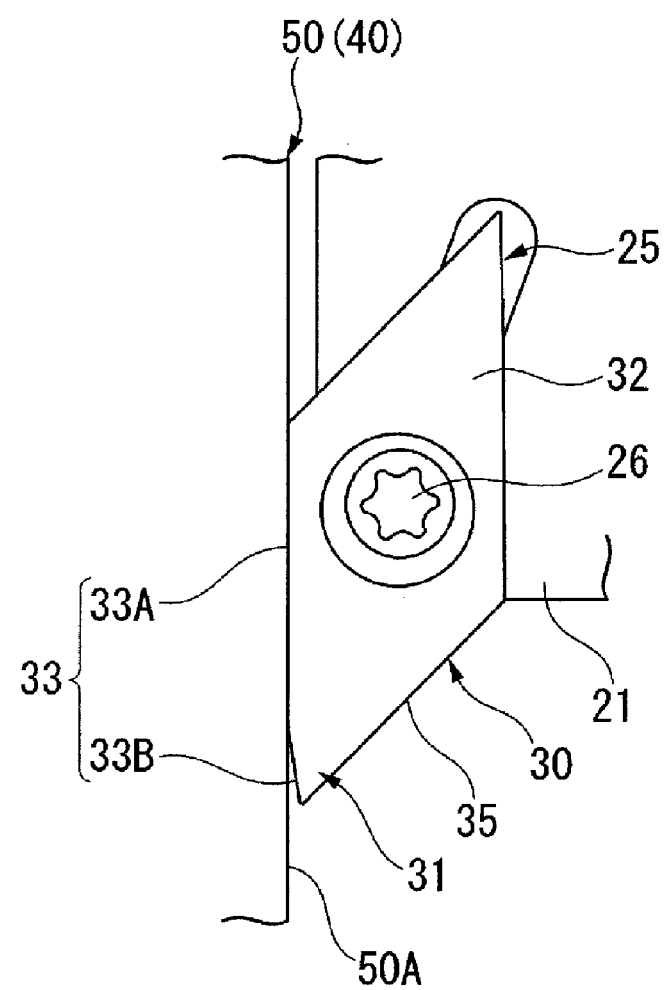
FIG. 4 is a side view showing a cutting edge insert provided in the ring with a cutting edge of FIG. 1.

As shown in FIGS. 1 to 3, the ring with a cutting edge 1 includes an approximately annular ring portion 10 having an insertion hole 11 formed nearly a circular shape in plane view for inserting the drill 40 in the direction of the axis O. A pair of protrusions, 20 and 20, are orthogonal to each other (i.e., intersecting) in the direction of the axis O, and protrude integrally in the direction of the axis O from a front end face 10A of the ring portion 10 facing the front end of the drill body 50, and a cutting edge insert 30 fixed to each protrusion 20.

The ring portion 10 has a portion, where a recess 12 is formed radially outward, on its inner peripheral surface 10C. The recess 12 has openings on both the front end face 10A of the ring portion 10 orthogonal to the direction of the axis O, and the rear end face 10B facing the rear end of the drill body 50. Namely, the recess 12 is formed in the shape of a groove which extends in the direction of the axis O.

Also, a circular-arc arm portion 13, which extends in the peripheral direction (in the rotational direction T in FIG. 3) from one peripheral end of the inner peripheral surface 10C toward the other peripheral end thereof, in the opening edge of the recess 12 facing the inner peripheral surface 10C, is formed integrally in the ring portion 10. Here, the radial inside face of the circular-arc arm portion 13 is a portion of inner peripheral surface 10C of the ring portion 10.

Further, gaps are formed between the circular-arc arm portion 13 and a bottom surface of the recess 12, and between a front end of circular-arc arm portion 13 in its extending direction and the other one peripheral end of the recess 12.

Thereby, the circular-arc arm portion 13 is adapted to be elastically deformable in the radial direction of the one peripheral end of the recess 12.

Moreover, the ring portion 10 has two or more (two in the illustrated example) threaded attachment holes 14 which go through the ring portion in the radial direction, and are opened to the bottom surface of the recess 12. Each of the threaded attachment holes 14 has a female threaded portion for threadly attaching the fastening screw 15 for pressing the circular-arc arm portion 13 inward from the radial outside (pressing means). In addition, the two or more of threaded attachment holes 14 are placed side by side in the direction of the axis O, and are also arranged such that they are off each other in the peripheral direction that corresponds to the twisted shape of the chip discharge groove 53 formed in the drill body 50.

In this construction, when operating the fastening screw 15 to make its front end protrude from the bottom surface of the recess 12, and also to make its front end press a circular-arc arm portion 13; the circular-arc arm portion 13 elastically deforms radially inward of the ring portion 10. Corresponding to this elastic deformation, the inner diameter of the insertion hole 11 of the ring with a cutting edge 1 becomes gradually smaller.

Further, a cap member 16, which protrudes axially inward from the inner peripheral surface 10C and fills the gap between the chip discharge groove 53 of the drill 40 inserted into the insertion hole 11 and the inner peripheral surface 10C, is detachably fixed to the front end face 10A of the ring portion 10.

A position of the each cap member 16 is to be located and a position of the threaded attachment hole 14 of the ring portion 10 is to be formed, are off each other in the peripheral direction. Therefore, the each cap member 16 prevents the front end of each fastening screw 15 from facing the chip discharge groove 53 via the circular-arc arm portion 13.

Moreover, each cap member 16 has a chip guide face 16A which is smoothly connected to an inner surface of the chip discharge groove 53. The chip guide face 16A has a form which is the shape of a concavely curved surface that guides an inner surface of the chip discharge groove 53 radially outward of the ring portion 10. In addition, in the illustrated example, the inner surface of the chip discharge groove 53 and the front end face 10A of the ring portion 10 are smoothly connected together by the chip guide face 16A. While the drill 40 is drilling, this construction can discharge the chips, generated during the drilling, radially outward from the chip discharge groove 53.

Each protrusion 20 has a slit 23A having a form which extends along the axis O toward the front end face 10A of the ring portion 10 from its front end. Each protrusion 20 is split by the slit 23A, into an inner protrusion 21 which fixes the cutting edge insert 30 and an outer protrusion 22 located more radially outside the ring portion 10 than the inner protrusion 21.

In addition, a cutout portion 23B, which has a larger width than the width of the slit 23A, is formed at the portion of the slit 23A near a base end of the protrusion 20. An insert attachment seat 25, for attaching the cutting edge insert 30 having a form recessed from the front face 21A of the inner protrusion 21 toward the leading side in the rotational direction T, is placed on the radially inner side of the front end of the inner protrusion 21. The cutting edge insert 30 is detachably fixed by the fixing screw 26 on condition that the cutting edge insert 30 is received in the insert attachment seat 25.

Further, the outer protrusion 22 has a threaded attachment hole 27 which goes through the ring portion 10 in its radial direction, and is opened to the inner protrusion 21 side. The threaded attachment hole 27 has a female threaded portion for threadedly attaching a position adjusting screw 28 for pressing the inner protrusion 21 radially inward. In this construction, the inner protrusion 21 can be elastically deformed radially in response to the outer protrusion 22 by operating the position adjusting screw 28. Thereby, the cutting edge insert 30 moves in the radial direction in response to the ring portion 10.

That is, the protrusion 20 and the position adjusting screw 28 constitute a position adjusting mechanism 29 for enabling movement of the cutting edge insert 30 in the radial direction in response to the ring portion 10. In addition, a cutout groove 24 recessed radially outward is formed on the radially inside of a base end of the inner protrusion 21. The inner protrusion 21 can be elastically deformed easily radially inward.

As shown in FIGS. 1 to 4, each cutting edge insert 30 chamfers the peripheral edge of an opening of a hole bored by the drill 40, and has a form of an approximately rhomboidal flat plate.

The cutting edge insert 30 has a rhomboidal front face 32 including a rake face of the cutting edge insert 30 toward the leading side in the rotational direction T, an opposite face 33 which faces an outer peripheral surface 50A of the drill body 50 on condition that the insert is attached to the insert attachment seat 25, and a side face 34 which forms a flank face of the cutting edge insert 30 toward the front end of the drill body. Also, a cutting edge 35 is formed at an intersecting ridgeline portion between the front face 32 and the side face 34.

Further, on condition that the insert is attached to the insert attachment seat 25, the opposite face 33 is constituted by a contact surface 33A which extends along the axis O and is capable of contacting the outer peripheral surface 50A of the drill body 50, and an oblique face 33B which extend toward the front end of the drill body 50 so as to separate from the outer peripheral surface 50A of the drill body 50.

The contact surface 33A and the oblique face 33B are formed sequentially and continuously from the rear end of the drill body 50 toward the front end thereof. Therefore, on condition that the cutting insert 30 is attached to the insert attachment seat 25, the cutting insert 30 has a form in which the front end 31 of the cutting edge insert 30, located at the front end of the drill body 50 and including the oblique face 33B with a portion of the cutting edge 35, is separated from the outer peripheral surface 50A of the drill body 50.

To fix the ring with a cutting edge 1 having the aforementioned construction to the drill 40 the drill body 50 is inserted into the insertion hole 11 of the ring portion 10 and then the fastening screw 15 is operated, i.e., rotated, to press the circular-arc arm portion 13 axially inward such that the fastening screw 15 moves axially inward.

During this operation, the inner diameter of the insertion hole 11 of the ring with a cutting edge 1 becomes gradually smaller, as aforementioned. Thus, the drill body 50 can be fastened by the inner peripheral surface 10C of the ring portion 10 including the circular-arc arm portion 13. Thereby, the ring with a cutting edge 1 will be fixed to the drill 40.

In addition, while this fixing operation; the cap member 16 is detached from the ring portion 10. After the completion of this operation, the cap member 16 is re-attached to the ring portion 10.

After the completion of constructing a cutting tool by fixing the ring with a cutting edge 1 to the drill 40; the cutting edge insert 30 is moved axially inward, and then touches the outer peripheral surface 50A of the drill body 50.

From the aforementioned explanation of the ring with a cutting edge 1 in this embodiment, the construction, in which a portion of the inner peripheral surface 10C of the ring portion 10 is the circular-arc arm portion 13, increases the contacting area between the inner peripheral surface 10C and the outer peripheral surface 50A of the drill 40. Therefore the fastening force of the ring with a cutting edge 1 to the drill 40 also increases, and the ring with a cutting edge 1 can be firmly fixed. In addition, as the two or more of screws 15, which press the circular-arc arm portion 13 axially inward of the ring portion 10, are arrayed in the direction of the axis O, the fastening force further increases.

Further, the ring with a cutting edge 1 has a construction, in which the ring portion 10 is fixed directly to the drill body 50 by the structure which the inner diameter of the insertion hole 11 becomes gradually smaller, as aforementioned.

Therefore, this construction prevents the occurrence of misalignment between the drill 40 and the ring with a cutting edge 1. Additionally, this construction can prevent the occurrence of misalignment between the drill 40 and the ring with a cutting edge 1.

Moreover, when fixing the ring with a cutting edge 1 to the drill 40, the screw 15 is moved axially inward. Therefore, the ring with a cutting edge 1 is prevented from rotating around the axis O in response to the drill body 50, and the ring with a cutting edge 1 is easily attachable to the drill 40.

Further, this ring with a cutting edge 1 is allowed to have a form in which the inner diameter of the ring portion 10 is larger (for example, 0.05 to 0.2 mm) than the outer diameter of the drill body 50. As a result, the drill body 50 can be easily inserted into the insertion hole 11 of the ring portion 10.

Further, after fixing the ring with a cutting edge 1 to the drill 40, the position adjusting mechanism 29 allows the cutting edge insert 30 to move axially inward and also to touch the outer peripheral surface of the drill. Therefore, even if misalignment occurs between the ring with a cutting edge 1 and the drill 40, two or more of the cutting edge inserts 30 can be placed correspondingly on the axis O of the drill 40. Moreover, by loosening the position adjusting screw 28 to release the pressure at the inner protrusion 21, the position adjusting mechanism 29 allows the cutting edge insert 30 to move radially outward. Therefore, when inserting the drill body 50 into the insertion hole 11, the cutting edge insert 30 can be prevented from rubbing against the outer peripheral surface 50A of the drill body 50, namely, the cutting edge insert 30 can be prevented from being pressed against the outer peripheral surface 50A. As a result, the cutting edge insert 30 can also be protected.

Further, the cap member 16 can prevent chips generated during the drilling by the drill 40 from entering the insertion hole 11. Additionally, since the cap member 16 has the chip guide face 16A like a concavely curved surface, the chips can be smoothly discharged. Moreover, the ring portion 10 is locked into the chip discharge groove 53 via the cap member 16. Thus, during the cutting edge insert 30 is machining the peripheral edge of a hole, the cap member can entirely prevent the ring with a cutting edge 1 from rotating in response to the drill 40.

Further, even if the cutting edge insert 30 contacts the outer peripheral surface 50A of the drill body 50, the front end 31 of the cutting edge insert 30 is separated from the outer peripheral surface 50A. Therefore, while machining the peripheral edge of a hole by the cutting edge insert 30, the front end 31 of the cutting edge insert 30 can be prevented from being sandwiched between the outer peripheral surface 50A of the drill body 50 and the peripheral edge of the hole. Thereby, an excessive stress imposed on the front end 31 of the cutting edge insert can be prevented. That is, while machining the peripheral edge of a hole, the cutting edge insert 30 can be protected.

In addition, the invention is not limited to the above embodiment, but various modifications can be made without departing from the spirit and scope of the invention. For example, in the embodiment, the ring with a cutting edge 1 is provided with the cutting edge insert 30 which performs chamfering. However, at least a cutting edge insert which machines the peripheral edge of a hole bored by the drill 40 has only to be provided. Accordingly, the ring with a cutting edge 1 may be provided with, for example, a cutting edge insert which performs counterboring and boring of a hole.

Further, the drill 40 which attaches the ring with a cutting edge 1 is not limited to an inset detachable type like the aforementioned embodiment. For example, a drill in which the cutting edge 35 is integrally formed may be adopted. Further, the drill 40 is not limited to the twist drill in which the chip discharge grooves 53 twisted toward the trailing side in the rotational direction T are formed. For example, however, a gun drill in which chip discharge grooves which extend linearly along the axis O are formed may be adopted.

Moreover, the circular-arc arm portion 13 is formed integrally together with the ring portion 10. For example, however, the circular-arc arm portion may be provided integrally in the ring portion 10 by being formed of a member separate from the ring portion 10, and being fixed to one end of the recess 12. Further, the recess 12 formed in the inner peripheral surface 10C of the ring portion 10 is opened to both the front end face 10A and the rear end face 10B of the ring portion 10. For example, however, the recess may be opened to either the front end face 10A or the rear end face 10B, and may not be opened to the front end face 10A and the rear end face 10B.

In this case, it is desirable that the circular-arc arm portion 13 may be provided so as to form a gap along with the opening edge of the recess 12 excluding one peripheral end of the recess 12.

I claim:

1. A ring with a cutting edge detachably fixed to a drilling tool and having a cutting edge insert which machines a peripheral edge of a hole bored by the drilling tool, comprising:
    a ring portion having:
        an insertion hole allowing the drilling tool to be inserted in
        the direction of an axis thereof; and
        a circular shape in plane view,
    wherein the ring portion has a portion on the inner peripheral surface provided with a recess formed radially outward,
    a circular-arc arm portion, which extends in the peripheral direction from one peripheral end of the inner peripheral surface toward the other peripheral end thereof, in the opening edge of the recess facing the inner peripheral surface and is elastically deformable in the radial direction, is formed integrally in the ring portion, and
    wherein the circular-arc arm portion is pressed axially inward by a fastening screw threadedly attached to a threaded attachment hole which goes through the ring portion in the radial direction and is opened to a bottom surface of the recess.

2. The ring with a cutting edge according to claim 1, further comprising a position adjusting mechanism which allows the cutting edge insert to move in the radial direction in response to the ring portion.

3. The ring with a cutting edge according to claim 2, further comprising:
    a protrusion which protrudes in the direction of the axis from a front end face of the ring portion which faces a front end of the drilling tool,
    wherein the protrusion is divided by a slit extending along the axis, into an inner protrusion which fixes the cutting edge insert, and an outer protrusion placed more axially outside than the inner protrusion, and
    wherein the position adjusting mechanism includes the protrusion and a position adjusting screw, which is threadedly attached to the outer protrusion that goes through the outer protrusion in the radial direction, and presses the inner protrusion axially inward in response to the outer protrusion.

4. The ring with a cutting edge according to claim 1,
    wherein a cap member, which protrudes axially inward from the inner peripheral surface and fills a gap between the inner peripheral surface and a chip discharge groove of the drilling tool, is fixed at the front end face of the ring portion facing the front end of the drilling tool.

5. The ring with a cutting edge according to claim 1,
    wherein the cutting edge insert is formed as such that, when the cutting edge insert has a contact with the outer peripheral surface of the drilling tool, a front end of the cutting edge insert located at the front end of the drilling tool along the axis is separated from the outer peripheral surface.

* * * * *